UNITED STATES PATENT OFFICE.

JAMES A. THOMAS AND FRANK E. KIMBLEY, OF HARTFORD, KENTUCKY.

OINTMENT.

SPECIFICATION forming part of Letters Patent No. 230,678, dated August 3, 1880.

Application filed June 25, 1880. (No specimens.)

*To all whom it may concern:*

Be it known that we, JAMES A. THOMAS and FRANK E. KIMBLEY, citizens of the United States, residing at Hartford, in the county of Ohio and State of Kentucky, have invented certain new and useful Improvements in Medical Compounds, of which the following is a specification.

The invention relates to an improved medical compound or ointment for the treatment and cure of the piles; and it consists in the combination of the following ingredients in about the proportions hereinafter named.

In carrying out our invention we take purified lard in proper quantities, and soften or liquefy it by the aid of heat, and add thereto extract of stramonium, extract of belladonna, extract of opium, and hydrastin or golden seal, and thoroughly incorporate the whole until it forms a homogeneous mass, which is allowed to cool and harden.

The proportions in which the ingredients are employed are as follows, viz: extract of stramonium, one part; extract of belladonna, one part; extract of opium, one part; hydrastin, one part; lard, eight parts.

The ingredients are mixed in any convenient manner by which they may be thoroughly incoporated.

The proportions of the ingredients may be varied somewhat without departing from our invention, and hence we do not wish to be understood as limiting ourselves to the specific proportions set forth.

The compound, as above prepared, is put up for sale, and applied in the same manner as the ointments in common use for the treatment of piles, and forms a soothing and efficient remedy.

Having thus described our invention, what we claim, and desire to secure by Letters Patent, is—

An ointment for the treatment of piles, consisting of stramonium, belladonna, opium, hydrastin, and lard, combined in or about the proportions herein specified.

In testimony whereof we affix our signatures in presence of two witnesses.

JAMES A. THOMAS.
FRANK E. KIMBLEY.

Witnesses:
E. DUDLEY WALKER,
CHARLES W. MASSIE.